Figure 1:
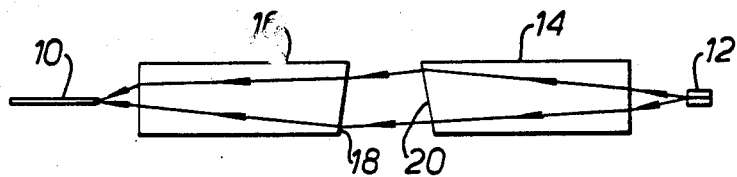

United States Patent [19]

Carter et al.

[11] Patent Number: 4,636,030
[45] Date of Patent: Jan. 13, 1987

[54] OPTICAL ALIGNMENT APPARATUS UTILIZING PRISMATIC ELEMENTS

[75] Inventors: Andrew C. Carter, Blisworth; William J. Stewart, Blakesley, both of England

[73] Assignee: Plessey Overseas Limited, Ilford, England

[21] Appl. No.: 582,008

[22] Filed: Feb. 21, 1984

[30] Foreign Application Priority Data

Feb. 23, 1983 [GB] United Kingdom ............... 8304981
May 7, 1983 [GB] United Kingdom ............... 8312650

[51] Int. Cl.⁴ .............................................. G02B 6/32
[52] U.S. Cl. ............................. 350/96.18; 350/96.19
[58] Field of Search ............. 350/96.15, 96.17, 96.18, 350/96.19, 96.20, 96.21

[56] References Cited

U.S. PATENT DOCUMENTS

| 4,475,788 | 10/1984 | Tomassini et al. | 350/96.20 |
| 4,484,793 | 11/1984 | Laude | 350/96.20 |
| 4,504,950 | 3/1985 | Au Yeung | 350/96.18 X |

FOREIGN PATENT DOCUMENTS 1492248 11/1977 United Kingdom .
2111716 7/1983 United Kingdom .

*Primary Examiner*—John Lee
*Attorney, Agent, or Firm*—Fleit, Jacobson, Cohn & Price

[57] ABSTRACT

A method for accurately aligning an optical fibre with a light source comprises firstly approximately aligning the axis of the fibre with the source (e.g. a laser) and locating two prismatic elements between the end of the fibre and the source. On or both of the prismatic elements is then moved to focus the image of the light source on to the end of the fibre and secured in position. The method can be described as an "Optical lever" as the movement of one of the prismatic elements causes a much smaller movement of the image and the method is thus very accurate. The prismatic elements can be any transparent members which produce an output beam which is angularly displaced from the input beam such as conventional prisms, gratings, diffused lenses or weak decentered lenses. Preferably they are cylindrical transparent rods with one end of each arranged at an acute angle to its axis.

9 Claims, 3 Drawing Figures

OPTICAL ALIGNMENT APPARATUS UTILIZING PRISMATIC ELEMENTS

This invention relates to optical connectors and more particularly to an optical connector for accurately aligning an optical fibre with a light emitting source such as the end of another optical fibre or a laser.

In this specification the term "light" includes light invisible to the human eye, such as infra-red and ultraviolet light.

The invention is particularly suitable for the alignment of a monomode optical fibre with the output of a solid state laser as this type of alignment must be accurate to within one or two microns to avoid serious loss of light. Direct alignment methods are difficult as the fibre must be fixed within these tolerances when aligned, for example by soldering or bonding with a suitable adhesive. Such fixing methods usually result in slight movement between the fibre and the laser when the solder or adhesive sets resulting in a loss of efficiency.

This invention is also suitable for connecting two monomode optical fibres since such fibres can have a high degree of eccentricity. Conventional mechanical alignment techniques, such as precision ferrules and V-grooves are normally only suitable for highly concentric fibres and alignment of monomode fibres by making them concentric by, for example, centreless grinding, are cumbersome and expensive. Conventional techniques are also unlikely to result in connectors which can be assembled in the field, which is a particularly useful attribute.

It is an object of the present invention therefore to provide an optical connector which will overcome or considerably reduce this problem.

According to the present invention an optical connector for accurately aligning an optical fibre with a light emitting source comprises supporting means for supporting the end of the optical fibre and the light emitting source in spaced apart relationship and substantially in alignment and at least two light deflecting members located therebetween, at least one of the light deflecting members being rotatable substantially on the axis of the end of the optical fibre whereby the image of the light emitting source can be moved to a position in which it is focussed on the end of the optical fibre.

Preferably there are two light deflecting members, and preferably both are rotatable substantially on the axis of the end of the optical fibre.

Each light deflecting member may comprise a cylindrical transparent member having its axis located substantially on the axis of the end of the optical fibre, and being rotatable about its axis, at least one end surface of the member being formed at an acute angle to the axis of the member whereby axial rotation of the member causes movement of the image of the light source.

Preferably two such cylindrical transparent members are provided substantially aligned in spaced apart relationship.

Preferably the adjacent ends of the two members have their surfaces formed at an acute angle to the axis of its respective member.

The light source may comprise an opto-electronic device such as a laser.

The light deflecting members may be permanently secured in position after the image of the light emitting source is focussed on the end of the optical fibre or alternatively they may be temporarily secured for future alignment operations.

Figure 2:
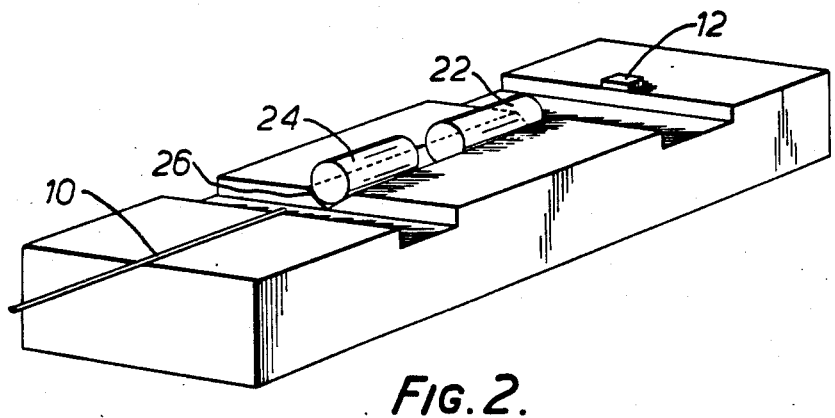
Figure 3:
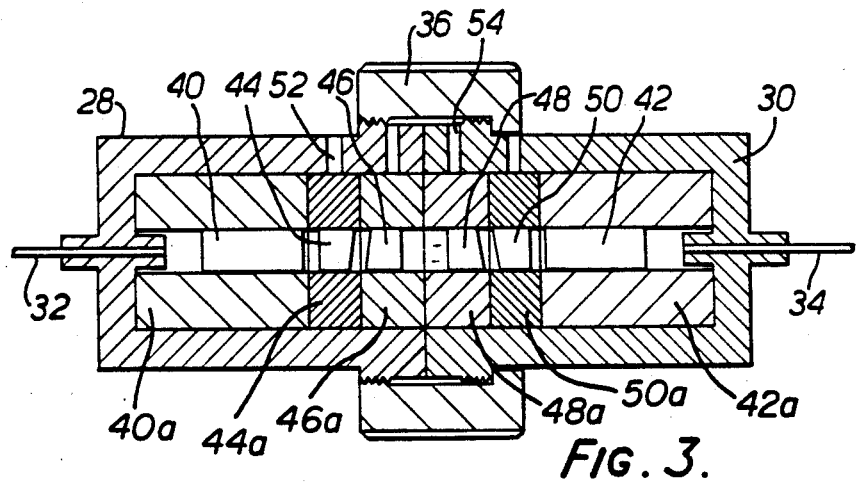

Embodiments of the invention will now be described by way of example only with reference to the accompanying drawings in which, FIG. 1 is a schematic drawing showing an optical connector for aligning an optical fibre with a light source in accordance with the invention, FIG. 2 is a pictorial view of one practical arrangement of the invention and FIG. 3 is a cross-sectional view of an optical connector according to the invention for joining two optical fibres.

In FIG. 1 there is shown the principle used in aligning an optical fibre 10 with a fixed injection laser diode 12. The axis of the fibre is substantially aligned with the laser and between them are interposed two prisms 14 and 16. The ends 18 and 20 of the prisms are arranged at angles and it will be seen that by relative movement between the fibre 10, the prisms 14, 16 and the laser 12 the image of the laser can be focussed on to the end of the fibre 10. Different angles on the ends 18 and 20 of the prisms will also alter the position of the image.

The alignment method can be described as an "optical lever" i.e. the movement of one component of the optical system causes a much smaller movement of the light source image. Hence if the prisms are secured by soldering or bonding any slight movement by the prisms when the solder or bonding material sets will cause a virtually negligible amount of movement of the image.

In FIG. 2 the prisms 22, 24 are cylindrical with their adjacent ends formed at an acute angle to a plane perpendicular to their respective axes. Optical alignment of the image of the laser 12 on to the end of the optical fibre 10 can be simply achieved by rotating one or both of the two prisms. The whole optical arrangment is conveniently maintained co-axial by placing the prisms 22, 24 in a V-groove 26 with their optical axes reasonably in line with the axis of the fibre 10 and the laser 12. Axial rotation of both prisms together will cause the image of the laser to describe a circle round the optical axis and rotation of one prism only will cause movement of the image through an arc towards or away from the optical axis. Consequently, rotational movement of the two prisms 22 and 24 makes possible imaging of the laser onto the end of the fibre even if these components are significantly off-axis.

The simplicity and co-axial nature of the arrangement enables it to be applied to complex planar optical systems as may be required in wavelength division multiplex subsystems.

The prisms may be normal glass rods or GRIN (graded refractive index) or SELFOC (Trademark) lenses.

The prisms can be permanently secured in position after imaging in, for example, a hermetically sealed container, although alternatively suitable means can be provided for temporarily securing the prisms so that future realignments are possible externally of the container.

The method is suitable for precision alignment of various optical systems, such as optical discs and optical fibre connectors (by passing light along one of two substantially aligned fibres) and integrated optic interconnectors.

FIG. 3 illustrates an optical fibre connector comprising two similar housings 28 and 30 the ends of which are adapted to accept the ends of optical fibres 32 and 34. The housings are intended to be connected together in abutting relationship such as by a collar 36.

Each housing contains a SELFOC (Trademark) lens 40, 42 and two cylindrical wedges 44, 46 48 and 50. The desired light beam is obtained by passing light along the fibre 32 and axially adusting the SELFOC (Trademark) lens 40. Rotation of one or both of the wedges 44, 46 displaces the direction of the beam until it is focussed in the required position. Both housings can be focussed independently so that the beam emerges from the housing centrally before they are clamped together, or the beam can be adjusted after the housings are clamped together by rotating the wedges until the brightest light is obtained from the other fibre. Thus the SELFOC (Trademark) lens and the wedges are accessible from outside the housings such as by suitable grooves 52, 54 formed in the housings 28 and 30 respectively. The SELFOC (Trademark) lens and the wedges may be secured in position after focussing, such as by a thermosetting resin, or they may be left for future adjustment.

As is apparent in the structure illustrated in FIG. 3, the lenses and wedges are each carried in respective carriers 40a, 42a, 44a, 46a, 48a, and 50a that position the respective lenses and wedges along the axis of the housings 28 and 30. The carriers are in abutting relationship to preclude relative axial movement between the respective lenses and wedges by fixing the lateral positions therebetween along the fibre axis, but to permit relative rotation therebetween.

In this specification the term "light deflecting member" includes any transparent member designed to produce an output beam which is angularly displaced from the input beam such as a conventional prism, a grating, a diffused lens or a weak decentred lens.

We claim:

1. An optical connector for accurately aligning an optical fibre with a light emitting source comprising supporting means for supporting the end of the optical fibre and the light emitting source in spaced apart relationship and substantially in alignment, and at least two independent light deflecting members located therebetween with at least one deflecting member having an inclined face, at least one of the light deflecting members being rotatable independently of and relative to the other light deflecting member and substantially on the axis of the optical fibre, whereby the image of the light emitting source can be moved to a position in which it is focussed on the end of the optical fibre.

2. An optical connector as claimed in claim 1 in which there are two light deflecting members.

3. An optical connector as claimed in claim 2 in which both of the two light deflecting members are rotatable independently of one another and substantially on the axis of the optical fibre.

4. An optical connector as claimed in claim 1 in which each light deflecting member comprises a cylindrical transparent member having its axis located substantially on the axis of the optical fibre and being rotatable about its axis.

5. An optical connector as claimed in claim 4 in which at least one end surface of each cylindrical transparent member is formed at an acute angle to the axis of the member whereby axial rotation of the member causes movement of the image of the light source.

6. An optical connector as claimed in claim 4 in which two cylindrical transparent members are provided substantially aligned in spaced apart relationship.

7. An optical connector as claimed in claim 6 in which the adjacent ends of the two cylindrical transparent members have their surfaces formed at an acute angle to the axis of its respective member.

8. An optical connector as claimed in claim 4 in which the positions of said at least two light deflecting members are fixed relative to each other along the axis of the optical fibre, but are rotatable relative to each other.

9. An optical connector as claimed in claim 1 in which the positions of said at least two light deflecting members are fixed relative to each other along the axis of the optical fibre, but are rotatable relative to each other.

* * * * *